(12) United States Patent
Cañete Martinez et al.

(10) Patent No.: US 11,171,873 B2
(45) Date of Patent: Nov. 9, 2021

(54) METHOD AND MANAGING NODE FOR MANAGING EXCHANGE OF PACKET FLOW DESCRIPTIONS

(71) Applicant: Telefonaktiebolaget LM Ericsson (publ), Stockholm (SE)

(72) Inventors: Antonio Cañete Martinez, Madrid (ES); Ibon Gochi Garcia, Madrid (ES); Maria Luisa Mas Rosique, Tres Cantos (ES); Miguel Angel Muñoz De La Torre Alonso, Madrid (ES)

(73) Assignee: Telefonaktiebolaget LM Ericsson (Publ)

( * ) Notice: Subject to any disclaimer, the term of this patent is extended or adjusted under 35 U.S.C. 154(b) by 0 days.

(21) Appl. No.: 16/769,882

(22) PCT Filed: Jan. 10, 2018

(86) PCT No.: PCT/EP2018/050566
§ 371 (c)(1),
(2) Date: Jun. 4, 2020

(87) PCT Pub. No.: WO2019/120628
PCT Pub. Date: Jun. 27, 2019

(65) Prior Publication Data
US 2021/0184978 A1 Jun. 17, 2021

(30) Foreign Application Priority Data
Dec. 21, 2017 (EP) .................................... 17382886

(51) Int. Cl.
*H04L 12/851* (2013.01)
*H04L 12/24* (2006.01)

(52) U.S. Cl.
CPC ...... *H04L 47/2441* (2013.01); *H04L 41/0893* (2013.01); *H04L 41/0896* (2013.01)

(58) Field of Classification Search
CPC ............. H04L 47/2441; H04L 41/0896; H04L 41/0893
See application file for complete search history.

(56) References Cited

PUBLICATIONS

ETSI TS 129 551 V15.0.0 (Jul. 2018) 5G; 5G System; Packet Flow Description Management Service; Stage 3 (3GPP TS 29.551 version 15.0.0 Release 15), Jul. 2018, 28 pages. (Year: 2018).*

(Continued)

*Primary Examiner* — Arvin Eskandarnia
*Assistant Examiner* — Chhian (Amy) Ling
(74) *Attorney, Agent, or Firm* — Christopher & Weisberg, P.A.

(57) ABSTRACT

A method and a managing node for managing exchange of information relating to Packet Flow Descriptors, PFDs, between an application server and a network exposure node are disclosed. The managing node receives a message comprising a PFD with a PFD identifier, an external application identifier associated with the PFD, a server identifier of the application server, a transaction identifier, and a network exposure identifier identifying an operator network. The managing node stores received information. The managing node selects, based on the network exposure identifier, a network exposure node. When a PFD selection identifier is included in the message, the managing node selects, based on the PFD selection identifier, a further PFD amongst the set of stored PFDs. The managing node also determines an action for the further PFD. The managing node further transmits, towards the network exposure node, the PFD and an indication of the action.

20 Claims, 9 Drawing Sheets

(56) References Cited

PUBLICATIONS

Ericsson, ZTE, "Management of PFDs to PCEF/TDF", 3GPP TDocs (written contributions), 3GPP TSG-SA2 Meeting #116, S2-164218, Jul. 11-15, 2016, Vienna, Austria, (rev. of merged S2-163329 and S2-163812), 8 pages. (Year: 2016).*
Nokia, Alcatel-Lucent Shanghai Bell, ZTE, "PFD retrieval and the procedures for sponsored data connectivity inhancement", 3GPP TDocs (written contributions), 3GPP TSG-SA2 Meeting #116, S2-164266, Vienna, Austria, Jul. 11-15, 2016, (revision of S2-164219), 2 pages. (Year: 2016).*
International Search Report and Written Opinion dated Aug. 16, 2018 for International Application No. PCT/EP2018/050566 filed on Jan. 10, 2018, consisting of 13—pages.
3GPP TS 29.122 V0.4.0 3rd Generation Partnership Project; Technical Specification Group Core Network and Terminals; T8 reference point for Northbound APIs (Release 15) Dec. 2017, consisting of 106—pages.
3GPP TS 29.250 V14.1.0 3rd Generation Partnership Project; Technical Specification Group Core Network and Terminals; Nu reference point between SCEF and PFDF for sponsored data connectivity (Release 14) Dec. 2017, consisting of 20—pages.
SA WG2 Meeting #121 S2-173305; Title: TS23.501:Storing PFD's in SDSF; Source: Huawei, HiSilicon; Document for: Approval; Agenda Item: 6.5.1; Location and Date: Hangzhou, China May 15-19, 2017, consisting of 4—pages.
3GPP TSG-CT WG3 Meeting #91 C3-174143; Title: 5G network capability exposure, functional entity; Source:. Ericsson; Location and Date: Krakow, Poland Aug. 21-25, 2017, consisting of 3—pages.
3GPP TSG-CT WG3 Meeting #91 C3-174323; Title: 5G network capability exposure, model; Source: Ericsson; Location and Date: Krakow, Poland Aug. 21-25, 2017, consisting of 4—pages.
SA WG2 Meeting #S2-124 S2-179495; Title: TS23.501:NEF Functionality; Source: Ericsson; Document for: Approval; Agenda Item: 6.5.11; Location and Date: Reno, Nevada, USA Nov. 27-Dec. 1, 2017, consisting of 2—pages.
3GPP TS 29.122 V0.2.0 3rd Generation Partnership Project;Technical Specification Group Core Network and Terminals;T8 reference point for Northbound APIs (Release 15), Sep. 2017, consisting of 78—pages.

* cited by examiner

METHOD AND MANAGING NODE FOR MANAGING EXCHANGE OF PACKET FLOW DESCRIPTIONS

CROSS-REFERENCE TO RELATED APPLICATIONS

This application is a Submission Under 35 U.S.C. § 371 for U.S. National Stage Patent Application of International Application No.: PCT/EP2018/050566, filed Jan. 10, 2018 entitled "METHOD AND MANAGING NODE FOR MANAGING EXCHANGE OF PACKET FLOW DESCRIPTORS," which claims priority to European Application No.: 17382886.4, filed Dec. 21, 2017, the entireties of both of which are incorporated herein by reference.

TECHNICAL FIELD

Embodiments herein relate to communication networks, such as computer networks including servers and clients or the like, in which Over-The-Top (OTT) collaborations provide capability exposure and exchange classification information between content providers and operator networks. In particular, a method and a managing node for managing exchange of information relating to Packet Flow Descriptors (PFDs) are disclosed. A corresponding computer program and a computer program carrier are also disclosed.

BACKGROUND

Technical Specification (TS) 29.122, developed by the Third Generation Partnership Project (3GPP), standardizes an interface called T8 between a Service Capability Server (SCS) or Application Server (AS) of an OTT provider and a Service Capability Exposure Function (SCEF) and a Packet Flow Descriptor Function (PFDF) in an operator network.

According to $5^{th}$ Generation (5G) telecommunication networks, a Network Exposure Function (NEF) is expected to encapsulate the following functions defined in the $4^{th}$ Generation (4G), namely the SCEF and the PFDF.

Section "4.4.10 Procedures for PFD Management" of TS 29.122 deals with exchange of user data traffic classification assistance information between OTTs and operator networks. This section describes that the PFDs are transmitted from the OTT through the SCS/AS to the operator network, e.g. a Packet Core (PC) thereof, through the SCEF, and then stores the PFDs in the PFDF. The PFDs describe different types of traffic used by the OTT services and are exchanged with the network for instance to implement zero rating or to optimize use cases. The use case may include identification of the OTT's traffic and keeping it out of quota, or identification of the OTT's traffic and transmitting it using improved Quality of Service (QoS) or the like.

Examples of PFDs include a destination address, according to IPv4 or IPv6, a Hyper Text marked-up Language Transfer Protocol (HTTP) Universal Resource Locator (URL) or any other parameter that can be used to identify traffic. All traffic to the destination address is matched by the PFD and considered for the use case in question.

FIG. 1 is an overview illustrating state of the art according to existing TS 29.122 in a 1:1 configuration. Hence, FIG. 1 illustrates a single OTT that interfaces with a single operator network.

Turning to FIG. 2, there is illustrated an overview of a further example according to existing TS 29.122 in a 1:N configuration. Hence, FIG. 2 illustrates a single OTT that interfaces with multiple operator networks.

Accordingly, state of the art assumes that the OTT, such as the SCS/AS, interacts directly with the operator networks. Disadvantageously, such direct interaction requires the OTT implements T8 to interact with the operator network, i.e. a specific implementation may be required for each operator network with which the OTT may wish to interact. Likewise, the operator network may be required implement T8 specifically for each OTT it may wish to interact with.

Furthermore, advanced functionality, such as verification of PFDs for repetitions, collisions or inconsistencies or the like, needs to be replicated on every single operator network, e.g. in the NEF of every single operator network, with which the OTT collaborates.

According to TS 29.122 the information exchanged between the SCS/AS and the SCEF when pushing a PFD to the SCEF/NEF, see section 4.4.10 Procedures for PFD Management, can be:
One or more set of PFDs and corresponding PFD identifiers,
External Application identifier associated to the PFDs,
SCS/AS identifier, that is the OTT identifier, and
T8 Transaction Reference ID (TTRI) that is a transaction identifier (for the PATCH or DELETE operation).

In view of the above, a disadvantage with the existing solutions may thus be that it is cumbersome and costly for the OTT to adapt and implement T8 interface to one or more different operators' networks.

SUMMARY

An object may be to at least reduce some of the above mentioned disadvantages of the solutions according to the current state of the art. In particular, the object may be how to improve exchange, management and/or tracking of information shared between OTTs and operator networks.

According to an aspect, the object is achieved by a method, performed by a managing node, for managing exchange of information relating to Packet Flow Descriptors, PFDs, between at least one application server and at least one network exposure node of an operator network. The managing node receives a message, originated from an application server. The message comprises a PFD with a PFD identifier, an external application identifier associated with the PFD, a server identifier of the application server originating the message, a transaction identifier, and a network exposure identifier identifying the operator network. The managing node stores, in a memory, the PFD associated with the PFD identifier, the external application identifier, the server identifier and the network exposure identifier, whereby a set of stored PFDs and associations are obtainable from the memory. The managing node selects, based on the network exposure identifier, a network exposure node amongst said at least one network exposure node. Thereby, the managing node is configured to forward a PFD, related to the external application identifier, to the network exposure node.

When a PFD selection identifier is included in the message, the managing node selects, based on the PFD selection identifier, a further PFD amongst the set of stored PFDs. In addition, the managing node determines an action to be performed on the selected PFD. The action is one of forwarding, updating and deleting. Moreover, the managing node transmits, towards the selected network exposure node, the selected PFD and an indication of the determined action.

Otherwise, e.g. when the PFD selection identifier is absent in the message, the managing node transmits, towards the selected network exposure node, the PFD with the PFD identifier, the external application identifier, the server identifier and the network exposure identifier.

According to another aspect, the object is achieved by a managing node configured for managing exchange of information relating to PFDs, between at least one application server and at least one network exposure node of an operator network. The managing node is configured for receiving a message, originated from an application server. The message comprises a PFD with a PFD identifier, an external application identifier associated with the PFD, a server identifier of the application server originating the message, a transaction identifier, and a network exposure identifier identifying the operator network. The managing node is configured for storing, in a memory, the PFD associated with the PFD identifier, the external application identifier, the server identifier and the network exposure identifier, whereby a set of stored PFDs and associations are obtainable from the memory. The managing node is configured for selecting, based on the network exposure identifier, a network exposure node amongst said at least one network exposure node. Thereby, the managing node is configured to forward a PFD, related to the external application identifier, to the network exposure node.

The managing node is configured for selecting, based on a PFD selection identifier, a further PFD amongst the set of stored PFDs, when the PFD selection identifier is included in the message. Additionally, the managing node is configured for determining an action to be performed on the selected PFD, e.g. also when the PFD selection identifier is included in the message. The action is one of forwarding, updating and deleting. Moreover, the managing node is configured for transmitting, towards the selected network exposure node, the selected PFD and an indication of the determined action, e.g. also when the PFD selection identifier is included in the message.

Moreover, the managing node is configured for transmitting, towards the selected network exposure node, the received PFD with the PFD identifier, the external application identifier, the server identifier and the network exposure identifier, e.g. when the PFD selection identifier is absent in the message.

In an embodiment, the PFD selection identifier may comprise a PFD source identifier identifying a third party from which the message is received at the managing node, and the managing node may be configured to also store the PFD source identifier associated with the PFD. Alternatively or additionally in an embodiment, the PFD selection identifier may comprise a PFD revision identifier identifying a change revision for a PFD, and the managing node may be configured to also store the PFD revision identifier associated with the PFD. Alternatively or additionally in an embodiment, the PFD selection identifier may comprise a PFD revision date identifier identifying a date of change for a PFD, and the managing node may be configured to also store the PFD revision date identifier associated with the PFD. In applicable sub-embodiments, the managing node may be configured for transmitting, towards the selected network exposure node, anyone of the PFD source identifier, PFD revision identifier, and the PFD revision date identifier.

According to further aspects, the object is achieved by a computer program and a computer program carrier corresponding to the aspects above.

Thanks to that the managing node receives the network exposure identifier, the managing node is able to identify the operator network for which the PFD may apply. The application server, as an example of an OTT, may thus inform the managing node about which operator network, the application server wishes to use with the PFD. Advantageously, the application server may interface with the managing node only, instead of a plurality of operator networks.

Additionally, thanks to that the managing node receives the PFD selection identifier, the managing node is able to select a further PFD based on the PFD selection identifier, which originates from the application server. Hence, the application server may control which PFD is selected by the managing node.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
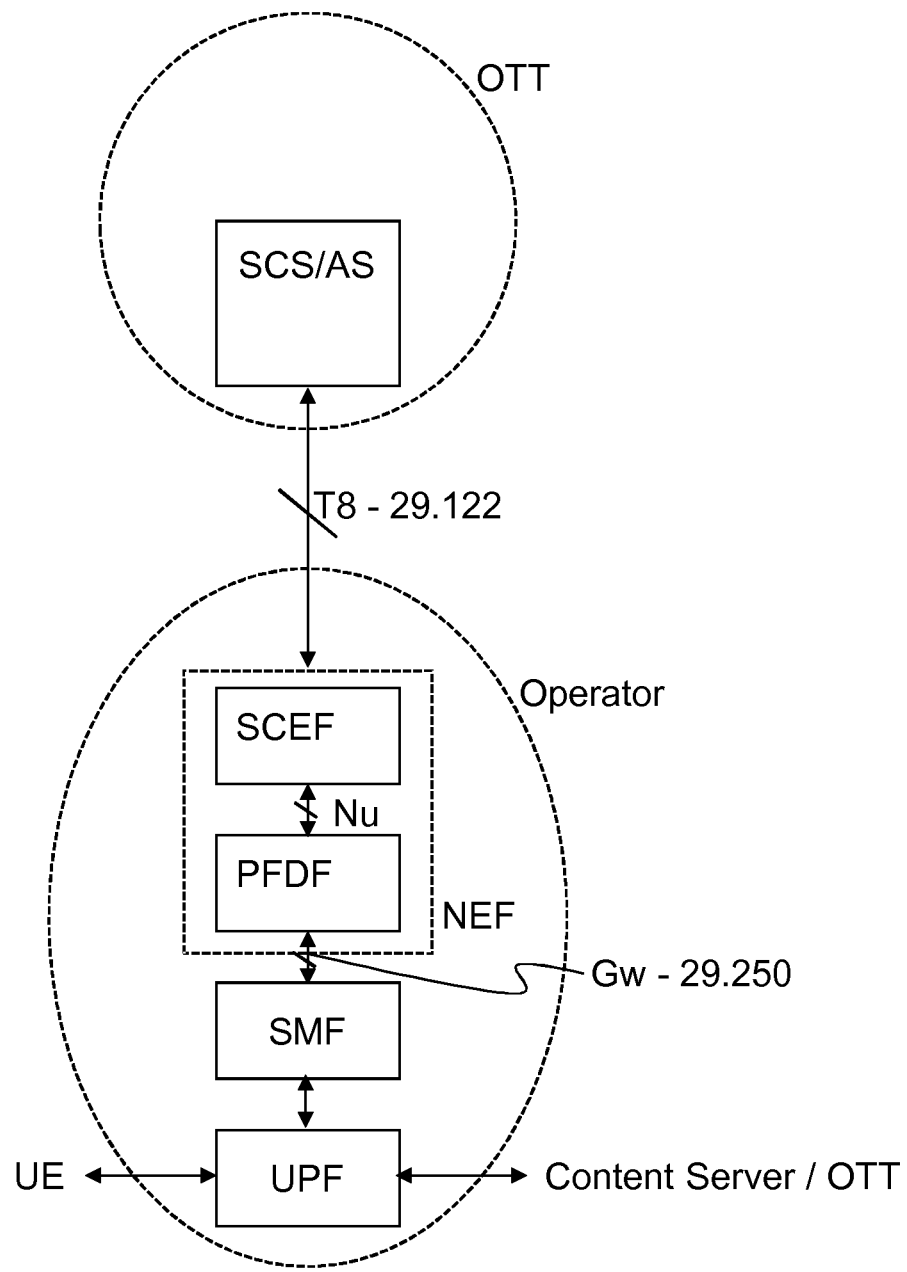
FIG. 1 is a schematic overview of an exemplifying system according to the state of the art.
Figure 2:
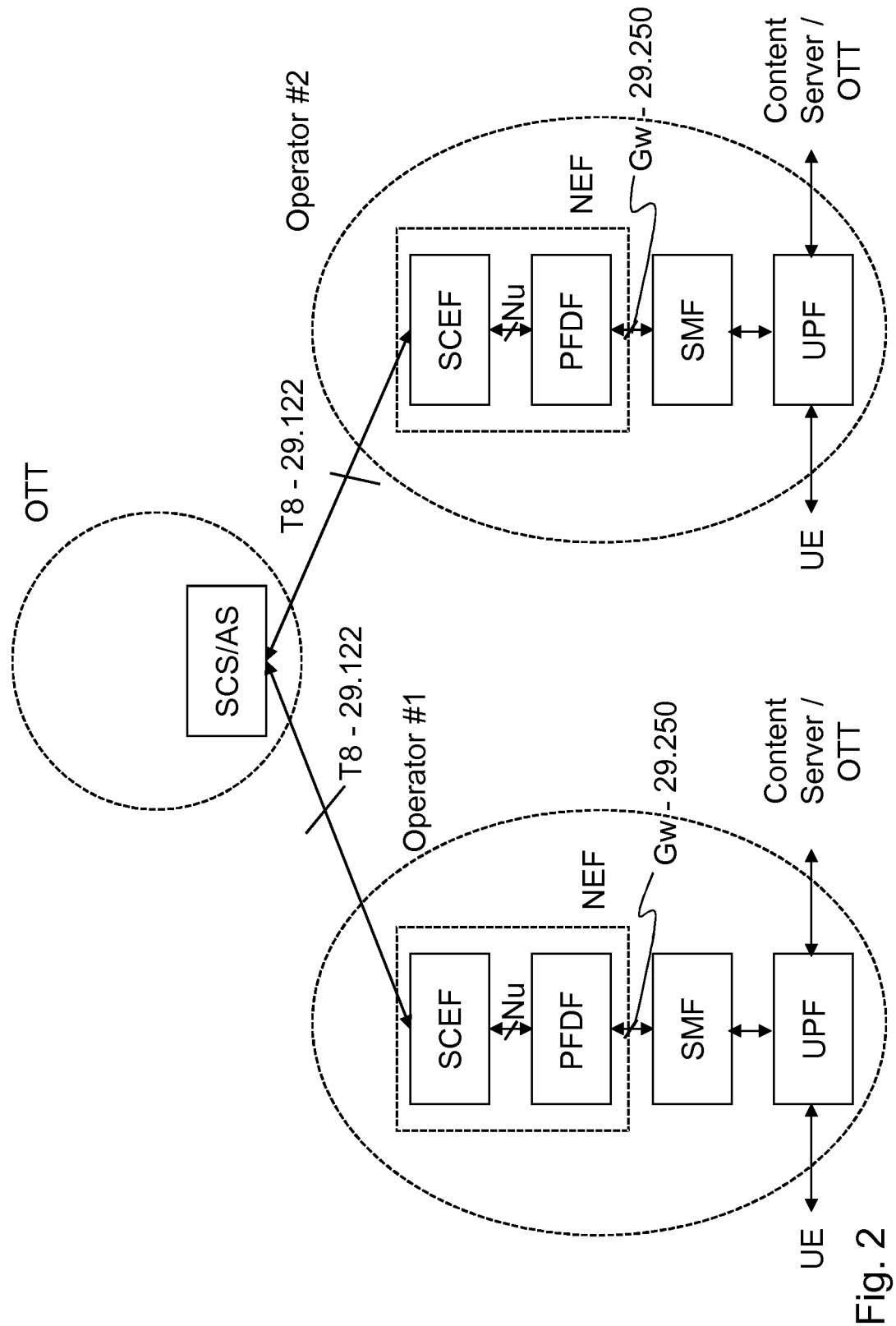
FIG. 2 is another schematic overview of a further exemplifying system according to the state of the art.

Throughout the following description, similar reference numerals have been used to denote similar features, such as nodes, actions, modules, circuits, parts, items, elements, units or the like, when applicable. In the Figures, features that appear in some embodiments are indicated by dashed lines.

Figure 3:
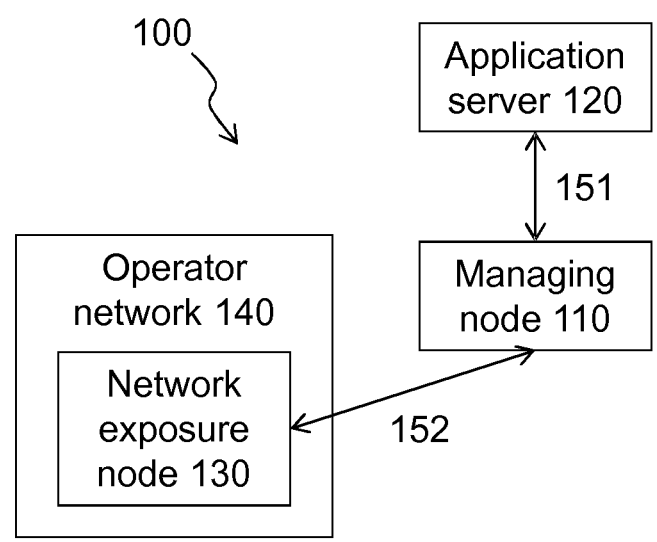
FIG. 3 is a further schematic overview of an exemplifying system in which embodiments herein are implemented.

FIG. 3 depicts an exemplifying system 100 in which embodiments herein may be implemented. Generally, the system 100 relates to telecommunication system based on 5G core network technologies.

The system 100 may be a communication system, including one or more networks based on one or more of the following technologies: Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, Multi-Standard Radio (MSR), multi, any 3rd Generation Partnership Project (3GPP) cellular network, Wi-Fi networks, Worldwide Interoperability for Microwave Access (WiMAX), 5G system, wired technologies using copper and/or optic links or the any other suitable communication technology.

The system 100 includes a managing node 110 according to the embodiments herein. The managing node 110 may be seen as a broker mediating communication between a NEF of an operator network and an application server (to be described further below) or the like. The managing node 110 may implement functionality of a NEF, e.g. including SCEF and PFDF. Alternatively or additionally, the NEF may implement similar, but non-standard functionality.

This means that the managing node 110 may implement at least one of a Service Capability Exposure Function (SCEF), and a Packet Flow Descriptor Function (PFDF), which may be associated with 5G network, or the like. Expressed differently, the managing node 110 may comprise one or more of the SCEF, the PFDF and the like.

Furthermore, the system 100 may be said to comprise an application server 120, such as an OTT, OTT server or the like. The application server 120 may correspond to a Service Capability Server (SCS) or the like. Expressed differently, the application server 120 may comprises the SCS or the like.

Moreover, the system 100 comprises an operator network 140, which may comprise a network exposure node 130. The network exposure node 130 may implement at least one of a Service Capability Exposure Function (SCEF), and a Packet Flow Descriptor Function (PFDF) or the like. Expressed differently, the network exposure node 130 may comprise one or more of the SCEF, the PFDF and the like.

The managing node 110 may communicate 151 with the application server 120 e.g. over an implementation of a T8 interface according to the embodiments herein.

The managing node 110 may also communicate 152 with the network exposure node 130 of the operator network 140, e.g. over an implementation of a T8 interface according to the embodiments herein.

Figure 4:
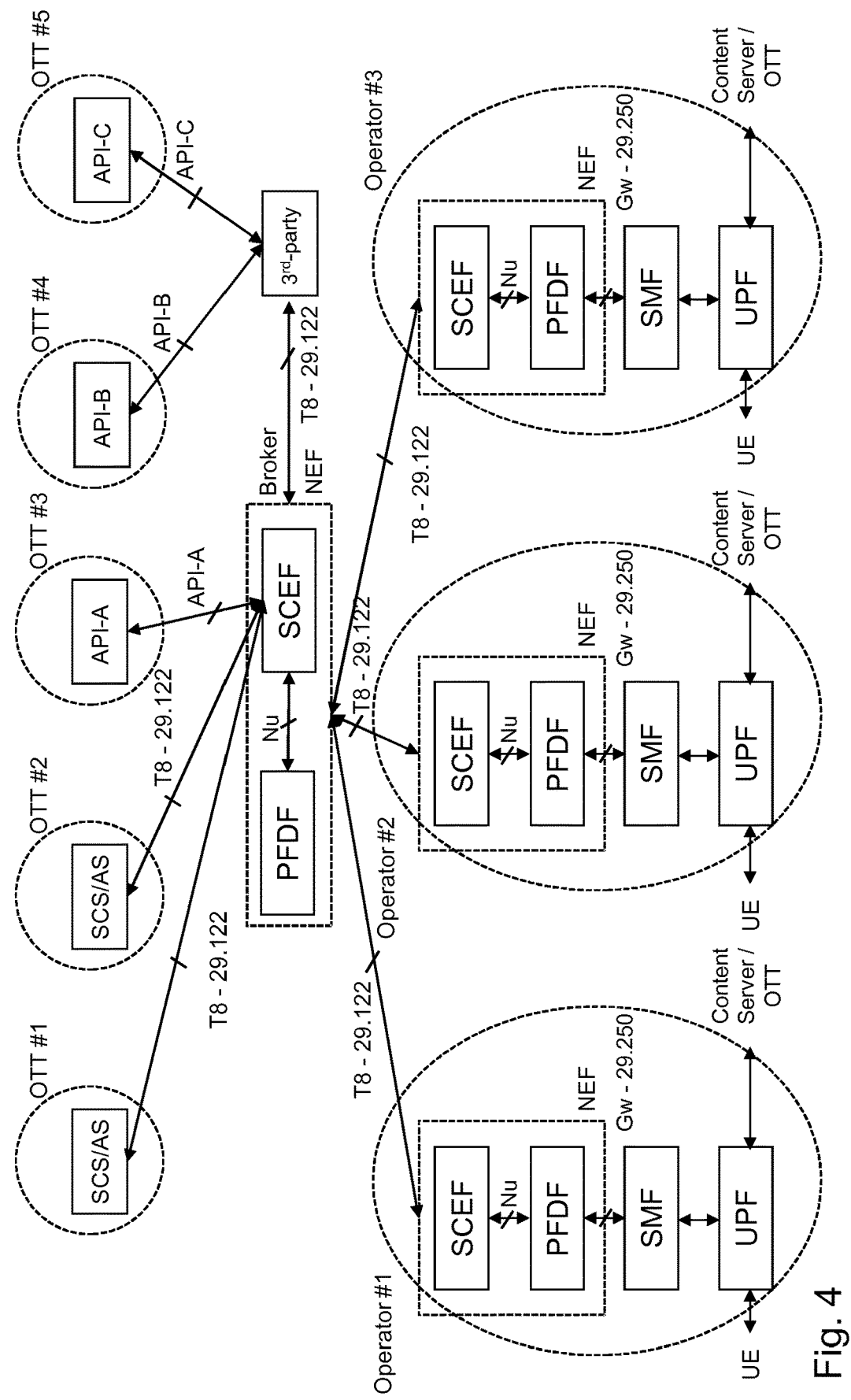
FIG. 4 is yet another schematic overview of a detailed exemplifying system in which embodiments herein are implemented.

FIG. 4 illustrates a more detailed view of a system, such as the system of FIG. 3, according to embodiments herein. From FIG. 4, it may be seen that an N:M configuration thanks to the embodiments herein may be achieved. N may represent a number of application servers and M may represent a number of operator networks. The application server(s) may be referred to as OTT(s) for short.

In this detailed example, the managing node 110 implements, on so called northbound direction, T8 for the OTTs supporting the T8 interface. According to the example, OTT #1 and OTT #2 support the T8 interface. Furthermore, the managing node 110 may implement a different set of Application Programming Interfaces (APIs) for the OTTs using legacy mechanisms for the exchange of PFDs. See for example OTT #3.

Moreover, as shown in FIG. 4, the managing node 110 may also support the T8 interface for 3rd parties that interact with other OTTs, such as OTT #4 and OTT #5, and maybe it could also implement proprietary APIs for other 3rd parties.

Also in a so called southbound direction, the T8 interface may be supported. However, additionally or alternatively, the managing node 110 may implement other interfaces or APIs towards the operator networks.

With this example, the managing node 110 may receive one or more of the following pieces of information:
one or more set of PFDs and PFD identifiers,
external Application identifier associated to the PFDs,
SCS/AS identifier, that is the OTT identifier, TTRI, that is a transaction identifier (for the push or delete operation),
NEF identifier, that is the operator network identifier,
PFD selection identifier, such as one or more of a PFD source identifier, a PFD revision identifier, a PFD date or the like.

Thanks to this information, it may be possible for the managing node 110 to correctly identify PFDs.

In this context, it may be noted that NEF identifier and the PFD selection identifier as described herein do not constitute state of the art according to known TS 29.122 specifications. As an example, the definition of the NEF identifier and the PFD selection identifier may therefore be included in future specifications of the T8 interface. It may be preferred that the NEF identifier and the PFD selection identifier are defined as integers.

In a particular example, the PFD selection identifier comprises the PFD source identifier, the PFD revision identifier, and the PFD date, which may be defined as follows. The PFD source identifier, the PFD revision identifier, and the PFD date may herein sometimes be referred to as fields, information pieces, information elements or the like.

NEF Identifier

The NEF identifier may identify the NEF (SCEF or SCEF plus PFDF), i.e. a target operator network, that receives the PFDs. As an example, the application server 120 may distribute different PFDs to different operator networks, such as the operator network 140, or to different geographical locations thanks the NEF identifier, which may mark that selection, where the NEF identifier may be sent to the managing node 110. The managing node 110 may distribute specific PFDs to specific NEFs out of a total list of PFDs distributed by the application server 120. As an example, each NEF—in each operator network—may only receive a subset of the available PFDs.

Furthermore, a NEF that receives a list of PFDs either directly from the application server, or via the managing node 110, may, based on the NEF identifier, ascertain whether the PFDs are applicable to the operator network where the NEF is located or not, i.e. the PFD may be applicable to some other operator network.

In this manner, the application server 120 may share different PFDs with different operator networks, or if a 3rd party may provide a set of PFDs only applicable to selected operator networks (maybe only to the operator networks that have a commercial relationship with this 3rd party). In other words, the NEF identifier may be used to send only some PFDs to certain networks.

PFD Source Identifier

If the distribution of the PFDs is performed by an entity other than the application server 120 originating the PFDs (SCS/AS identifier does not match the PFD source identifier, for instance when a 3rd party is used for the distribution), the managing node 110 may use the PFD source identifier to either choose which PFDs to distribute or to remove certain PFDs and keep others. The entity may e.g. be a third party. These set of actions could also be performed by the NEF server.

For instance, if the managing node 110 or the NEF server receives or has stored
a) a set of PFDs from a given application server (identifier by the SCS/AS identifier) with the PFD source identifier matching the SCS/AS identifier, and
b) another set of PFDs from a given OTT, identified by the SCS/AS identifier, with the PFD source identifier not matching the SCS/AS identifier.

In these cases, the managing node 110 or the NEF server may decide to keep
- the list of PFDs sourced and distributed by the application server 120, or
- the list of PFDs not sourced by the application server 120.

If the list of PFDs sourced and distributed by the application server 120 is considered more authoritative, that list may be used. However, sometimes, the list of PFDs not sourced by the application server 120 may be used, e.g. because it is a local, customized list that may be used as it would contain local corrections, amendments or extensions.

In this manner, e.g. the third 3rd party may be allowed to provide PFDs for multiple application server(s).

Sometimes, the PFD source identifier, may be equal to the SCS/AS identifier if the application server 120 provides PFDs for its own services, but the PFD source identifier may be different if a 3rd party collects PFDs from the application server(s) 120.

This may be required if a single 3rd party wishes to provide PFDs from multiple application servers. The PFD source identifier may identify the 3rd party and the SCS/AS identifier may identify the application server 120. The PFD source identifier allows for the identification of the source, typically the application server, for the PFD.

PFD Revision Identifier

Irrespective of the source and the distribution of the PFDs, a PFD revision identifier may be used to revision control of PFDs. For instance, if every time a PFD is changed the revision identifier is incremented, higher revision identifier can be used to detect more recent—and up-to-date—PFDs.

In case the managing node 110 or a NEF server identifies two similar PFDs, it may use the revision identifier to locate the more recent one and it may then proceed by replacing existing PFDs, since they will be considered as older or out-of-date.

PFD Date—PFD Revision Date

In the same way that a revision identifier may be used to implement a revision control system on the PFDs, a revision date can also be used to track older/more-recent PFDs. The use cases that may be implemented with the revision date are similar to the ones implemented with a revision identifier, with the advantage that the revision date provides temporal information on when the PFD was updated. A change in the revision date informs of when the change happened, whereas a change in the revision identifier only informs that a change has happened.

Thanks to the two aforementioned fields, tracking and debugging capabilities may be implemented.

Figure 5:
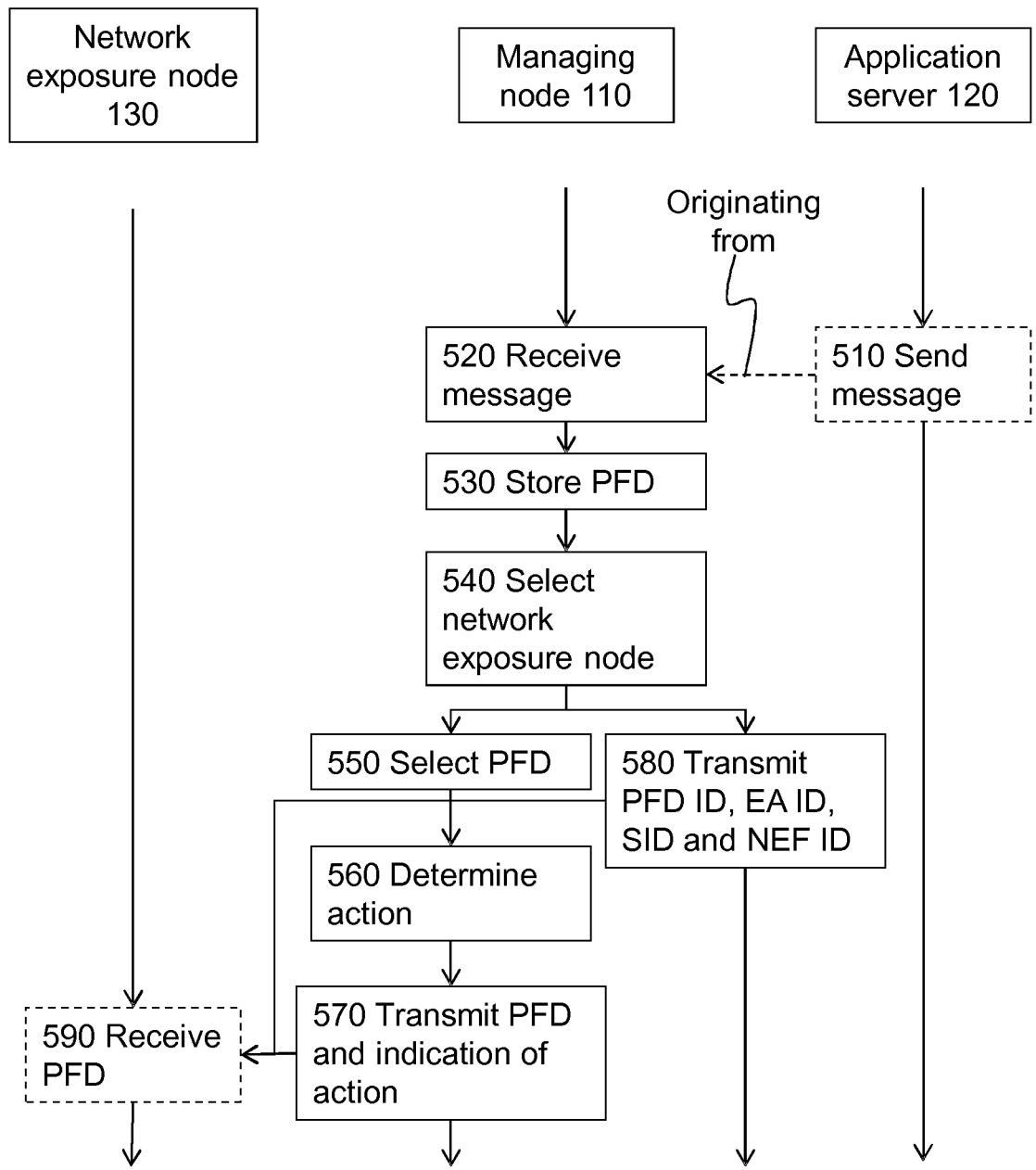
FIG. 5 is a combined signaling and flowchart illustrating the methods herein.

FIG. 5 illustrates an exemplifying method according to embodiments herein when implemented in the network 100 of FIG. 1.

The managing node 110 performs a method for managing exchange of information relating to Packet Flow Descriptors, PFDs, between at least one application server 120 and at least one network exposure node 130 of an operator network 140.

One or more of the following actions may be performed in any suitable order.

Action 510

The application server 120 may send a message to the managing node 110 or to a third party (shown in FIG. 4).

The message comprises a PFD with a PFD identifier, an external application identifier associated with the PFD, a server identifier of the application server 120 originating the message, a transaction identifier, and a network exposure identifier identifying the operator network 140.

Action 520

Subsequent to action 510, the managing node 110 receives a message, originated from the application server 120, i.e. either directly from the application server 120, via the third party or the like.

Action 530

The managing node 110 stores, in a memory, the PFD associated with the PFD identifier, the external application identifier, the server identifier and the network exposure identifier, whereby a set of stored PFDs and associations are obtainable from the memory.

In some embodiments, the managing node 110 may also store the PFD source identifier, the PFD revision identifier and/or the PFD revision date, as an optional PFD selection identifier might indicate, associated with the PFD in the memory.

Action 540

The managing node 110 selects, based on the network exposure identifier, a network exposure node 130 amongst said at least one network exposure node 130. As a result, the managing node 110 may become configured to forward a PFD, related to the external application identifier, to the network exposure node 130. The PFD may be the received PFD, as identified by the PFD identifier, or the PFD selected according to a PFD selection identifier, if received in the message.

In this manner, the managing node 110 is able to identify which operator network to be used.

Now, the manging node 110 may handle two different cases. A first case relates to when a PFD selection identifier is included in the message, see actions 550-570, and a second case relates to when the PFD selection identifier is absent in the message, see action 580, i.e. excluded from, not present in and the like the message.

Action 550

According to the first case, the managing node 110 selects, based on the PFD selection identifier, a further PFD amongst the set of stored PFDs.

The PFD selection identifier may correspond to a PFD source identifier identifying the third party from which the message is transmitted. The PFD source identifier is thus received at the managing node 110. The third part may have received the PFD selection identifier from the application server 120. This may mean that the PFD selection identifier may comprise the PFD source identifier.

The PFD selection identifier may further correspond to a PFD revision identifier identifying a change revision for a PFD, and the managing node 110 is configured to also store the PFD revision identifier associated with the PFD. This may mean that the PFD selection identifier may comprise the PFD revision identifier.

The PFD selection identifier may additionally correspond to a PFD revision date identifier identifying a date of change for a PFD, and the managing node 110 may then also be configured to store the PFD revision date identifier associated with the PFD. This may mean that the PFD selection identifier may comprise the PFD revision date.

In view of the above, the PFD selection identifier may comprise one or more of the PFD source identifier, the PFD revision identifier, the PFD revision date or the like.

Action 560

Figure 6:
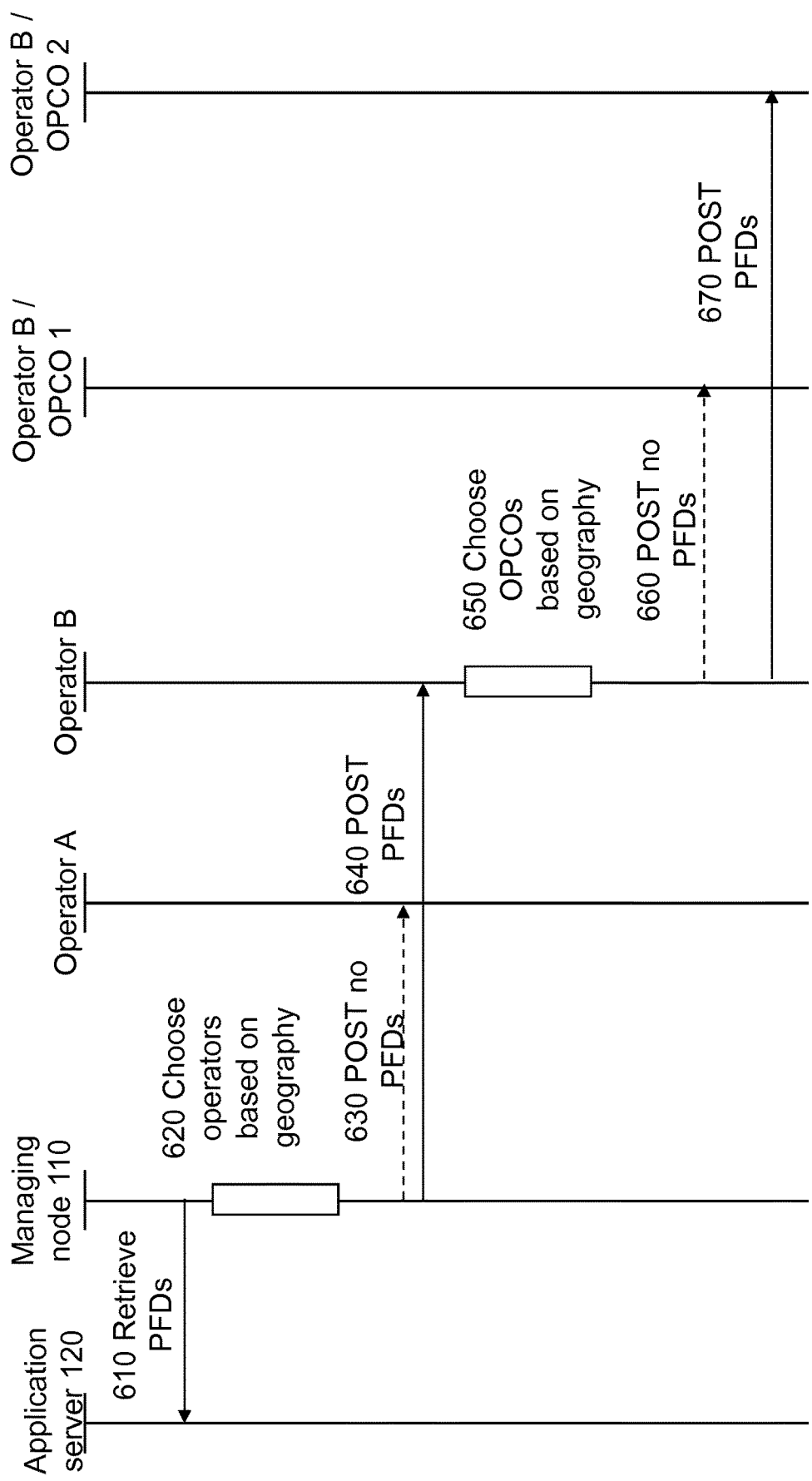
FIG. 6 is a further combined signaling and flowchart illustrating an exemplifying method according to the embodiments herein.
Figure 7:
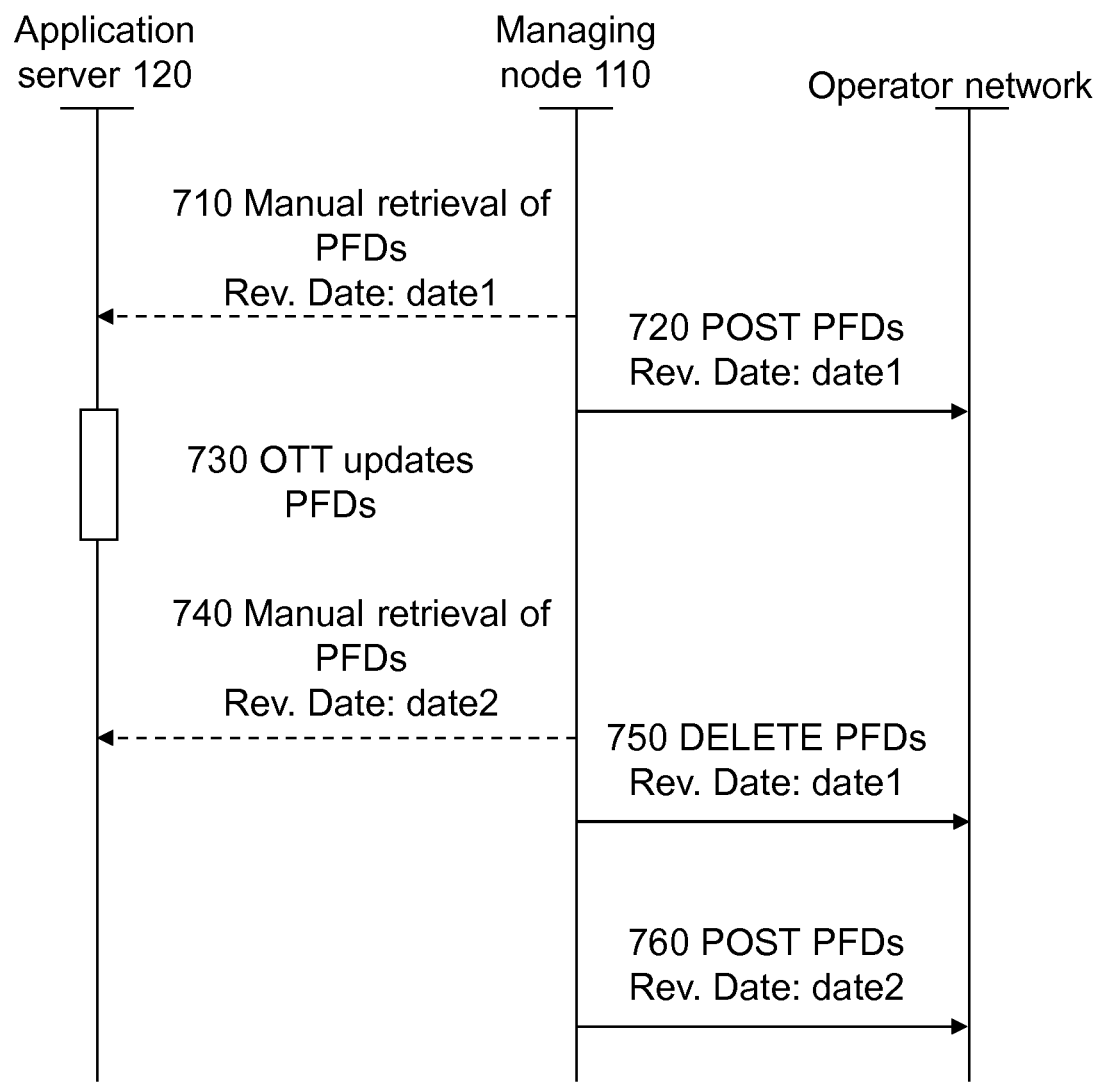
FIG. 7 is another combined signaling and flowchart illustrating a further exemplifying method according to the embodiments herein.
Figure 8:
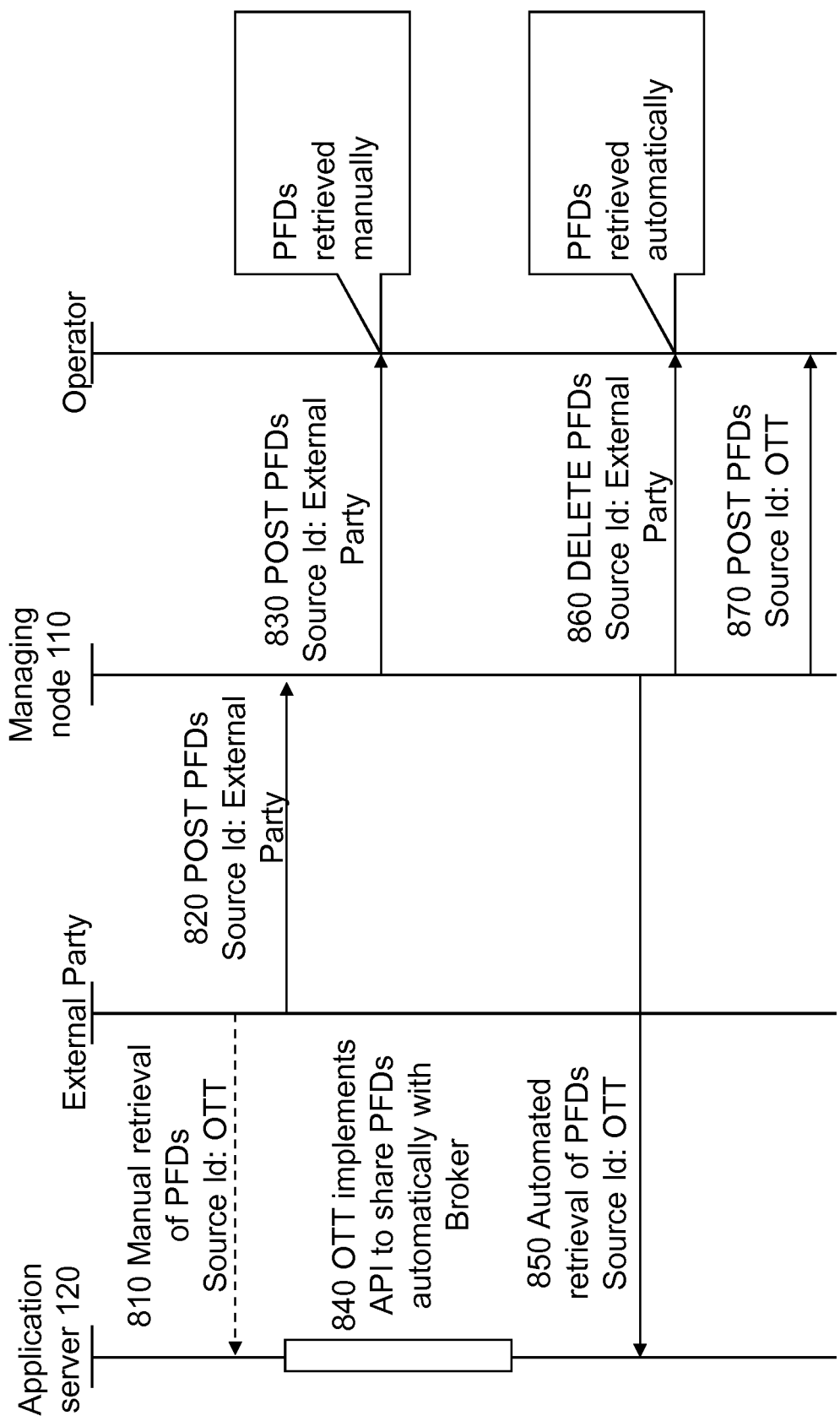
FIG. 8 is a still further combined signaling and flowchart illustrating yet another exemplifying method according to the embodiments herein.

Also according to the first case, the managing node 110 determines an action to be performed on the selected PFD. The action is one of forwarding, updating and deleting. Forwarding may also be referred to as push. In FIGS. 6, 7 and 8, examples relating to forwarding, updating and deleting is described.

Action 570

As part of the first case, the managing node 110 transmits, towards the selected network exposure node, the selected PFD and an indication of the determined action. And wherein the method otherwise comprises:

Action 580

In contrast to actions 550, 560 and 570, the second case prescribes that the managing node 110 transmits, towards the selected network exposure node 130, the PFD with the PFD identifier (PFD ID), the external application identifier (EA ID), the server identifier (SID) and the network exposure identifier (NEF ID).

As mentioned above, the action is one of forwarding, updating and deleting. In the following, a few non-limiting and non-exhaustive examples will be given for each of the aforementioned actions.

FIG. 6 illustrates an example in which the managing node forwards, or pushes, PFDs to a selected set of operator networks. In this example, the NEF identifier, i.e. the operator network identifier, is used. The NEF identifier may be represented by use of integers, and the integers to represent operator networks or Operating Companies (OPCOs). Since it is unlikely that there is an alignment between the geographical location or the operator network identified in each different OTT and the NEF identifier used by the managing node 110, a conversion may be needed.

The application server is exemplified by an OTT.

OTTs might serve content differently for different geographical locations or different operators. For instance, an OTT might have different datacenters serving different locations or might have CDNs (Content Delivery Network) in some operator networks and not in others. Since the PFDs might classify traffic based on destination (i.e. destination IP subnets), different datacenters or the presence or not of CDNs will result in different PFDs for the same OTT across different regions and operator networks.

Using the NEF identifier information element, the managing node 110 may choose to which operator network to send the specified PFDs. If the source of the PFDs (OTT) includes information that allows operator network segmentation—for instance based on geographical location or operator network name—the managing node 110 may force the selection of the destination operator network, by either a) not sharing the PFDs with operator networks outside the desired geographical region or not listed or b) in case an operator network spawns across different geographical regions or has several OPCOs, help in the selection of the PFDs to be pushed to each local OPCO.

One or more of the following actions may be performed in any suitable order.

Action 610

The managing node 110 retrieves PFDs from an application server 120. The PFDs may include operator network information or geographical information, i.e. a target operator network. It is assumed that the interface between the application server 120 and the managing node 110 is proprietary and not standardized. This means that different OTTs may expose this information, i.e. the information included in the message described above, differently.

Action 620

The managing node 110 may store the target operator network or geographical target area along with the definition of the PFDs, e.g. by associating a value into the new NEF identifier field. In this manner, operator network selection may be enabled when implementing the POST, PATCH or DELETE operations defined in 29.122.

As a result, the managing node 110 may choose operator e.g. based on geography and/or according to the NEF identifier, which may have been retrieved in action 610.

Action 630

The managing node 110 thus makes a decision, based on the NEF identifier associated to the PFD, not to POST the PFDs to the operator network A.

Action 640

In contrast to action 630, the managing node 110 makes a decision, based on the NEF identifier associated to the PFD, to post the PFDs only to the operator network B.

Action 650

The operator B now receives the PFDs and the NEF identifier associated therewith. Therefore, the operator B may do a further selection and choose OPCOs based on e.g. geography. The operator B may decide to share some of the PFDs with some OPCOs and not with some others. In this example, only the OPCO 2 of the operator network B receives the PFDs.

Choosing the destination operator network via the NEF identifier information element allows for PFD segmentation in case the OTT serves content from different locations.

Action 660

The operator B does hence not post the PFDs to the OPCO 1.

Action 670

The operator B therefore posts the PFDs to the OPCO 2.

FIG. 7 illustrates an example in which the managing node updates PFDs with PFDs having a new revision. In this example, usage of two information elements, i.e. the PFD revision identifier and the PFD revision date, is illustrated. These two information elements may be used to track and locate exiting PFDs and to differentiate them from new/more recent, PFDs.

The figure above shows how PFDs may be updated by the managing node 110 by use of the revision date. Alternatively or additionally, the revision identifier could also be used to identify later/newer PFDs.

One or more of the following actions may be performed in any suitable order.

Action 710

The managing node 110 retrieves PFDs manually. Alternatively, the managing node 110 may retrieve the PFDs retrieved automatically.

Action 720

The managing node 110 thus posts the PFDs to the operator network with the revision date: date1.

Action 730

At the application server 120, the PFDs are updated.

Action 740

The managing node 110 detects the update of the PFDs in the application server 120 and assigns a new revision date information element to the different set of PFDs, i.e. date2.

The managing node 110 also retrieves the PFDs, i.e. the updated PFDs, from the application server 120.

Action 750

The managing node 110 may decide to delete the old PFDs based on the revision date. In this manner, the managing node 110 may ensure that no old information is kept and that the new set of PFDs replaces the old set completely.

Action 760

The managing node 110 may thus post the updated PFDs with revision date date2 to the operator network.

FIG. 8 illustrates an example in which the managing node deletes PFDs from selected sources, e.g. external party and connected OTT (application server 120). In this example, the PFD source identifier is used.

In case an external party is the source for the PFDs that are POST:ed to the managing node 110 (or the destination operator networks directly), the identification of the source can be useful to avoid duplications and control of the PFDs. For instance, the managing node 110 or an operator network may use the PFDs of an external party if they don't have accesses to the PFDs from the application server 120 directly, but might want to remove the PFDs from the external party once direct access is obtained (to avoid duplications).

One or more of the following actions may be performed in any suitable order.

Action 810

The external party retrieves the PFDs from the application server 120. The external party may associate the PFDs with a PFD source identifier.

Action 820

Next, the external party posts the PFDs to the managing node 110.

Action 830

The managing node 110 posts the PFDs to the operator, e.g. according to the NEF identifier.

Action 840

The application server 120 is updated with an implementation of an API that allows PFDs to be shared automatically with the managing node 110 or the like.

Action 850

The managing node 110 may thus make use of the API and automatically retrieve the PFDs which are associated with a PFD source identifier identifying the application server 120.

Action 860

The managing node 110 may delete the PFDs obtained from the external party, which PFDs are associated with the PFD source identifier identifying the external party.

Action 870

Subsequently, the managing node 110 pushes, or posts, the PFDs with the PFD source identifier identifying the application server 120.

As seen from the above, the association of a PFD (which will in any case contain a reference to the External Application identifier) with a source identifier allows for additional control of the PFDs in case of duplications. The figure may represent a scenario in which an external party (for instance an employee of the company implementing the managing node 110) can get access to the PFDs from the application server 120 in a way that is not automated or controlled—for instance, by receiving an email from another employee of the OTT. The PFDs exchanged in that way can be valid, but they will be very difficult to track, to update and to maintain. By assigning them a specific source identifier, they can be tracked.

If later on a new, possible automated mechanism (an API), exists to exchange PFDs between the same application server 120 and the managing node 110, the new PFDs can be tagged with a different source identifier which will differentiate them from the original PFDs obtained manually.

The embodiments herein may be realized as an extension to the existing T8 interface (29.122) in 5G to share Packet Flow Descriptors—PFDs—from a Service Capability Server or Application Server—SCS/AS—to more than one Network Exposure Functions—NEFs (including Service Capability Exposure Function SCEF and Packet Flow Descriptor Function PFDF)—in several different operator networks.

One or more of the following advantages may be envisaged according to at least some embodiments herein.

Information from various application servers, such as OTTs, may be concentrated in a single point for distribution, i.e. the managing node.

Information from various application servers may easily be distributed to multiple operator networks, simplifying deployments.

Allowing distribution of PFDs from application servers to operator networks based on geographical location, which means that operator networks in different locations may get different PFDs.

The managing node may adapt and interface multiple systems, which are not necessarily implementing the T8 interface according to state of the art.

The managing node may further, by means of implementation of specific interfaces, support application servers that does not implement the T8 interface.

The managing node may support application servers that do not implement certain versions of the T8 interface.

The managing node may support application servers that do not implement the T8 interface in the NEF (SCEF and PFDF).

The managing node may support operator network that only implement versions of the T8 interface that are not supported by the application server(s).

The managing node may allow application servers to contact only one organization, i.e. the managing node—acting as a broker according to the embodiments herein—leaving to this organization the interaction with multiple operator networks.

The managing node may allow operator networks to contact only one organization, i.e. the managing node—acting as a broker according to the embodiments herein—leaving to this organization the interaction with multiple application servers, such as OTTs.

The managing node may provide value added PFD verification functionality—like detection of duplications, collisions between OTTs, etc.—and offering operator networks a simplified set of PFDs without the need to care for the details of the implementation.

The managing node may allow OTTs to push different sets of PFDs to different operator networks, allowing for different set of use cases being deployed in different operator networks for the same OTT.

The managing node may allow 3rd parties (not OTTs) to provide PFDs for multiple OTTs acting or not, on behalf of these OTTs.

The managing node may provide PFD tracking and debugging techniques that could allow the identification of the source of the PFDs (which might not be the managing node itself but the above mentioned 3rd party) and a versioning system to detect out of date or incorrect PFDs.

The managing node may improve troubleshooting and debugging operations by versioning the PFDs and providing the identifier of the PFD source.

And in general, the managing node allows for a flexible operation and distribution of PFDs, simplifying the communication between application server(s) and operator networks.

Figure 9:
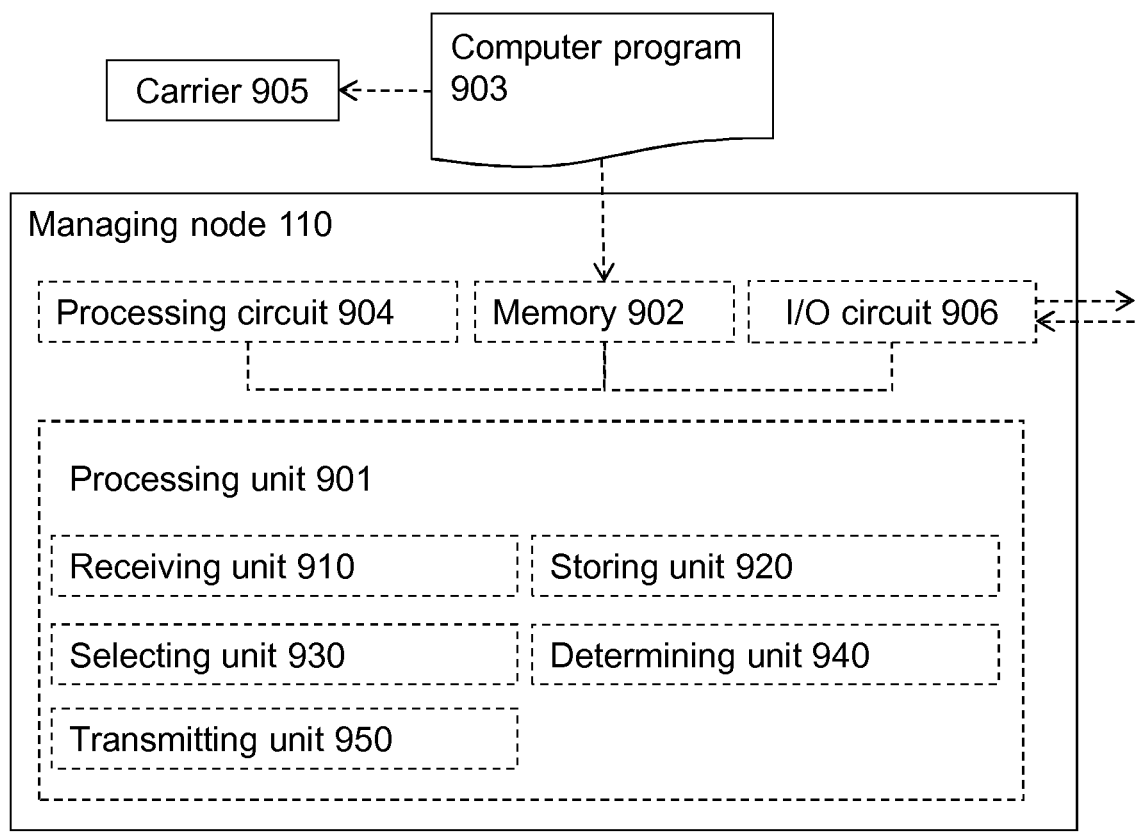
FIG. 9 is a block diagram illustrating embodiments of the managing node.

With reference to FIG. 9, a schematic block diagram of embodiments of the managing node 110 of FIG. 1 is shown.

The managing node 110 may comprise a processing unit 901, such as a means for performing the methods described herein. The means may be embodied in the form of one or more hardware units and/or one or more software units. The term "unit" may thus refer to a circuit, a software block or the like according to various embodiments as described below.

The managing node 110 may further comprise a memory 902. The memory may comprise, such as contain or store, instructions, e.g. in the form of a computer program 903, which may comprise computer readable code units.

According to some embodiments herein, the managing node 110 and/or the processing unit 901 comprises a processing circuit 904 as an exemplifying hardware unit, which may comprise one or more processors. Accordingly, the processing unit 901 may be embodied in the form of, or 'realized by', the processing circuit 904. The instructions may be executable by the processing circuit 904, whereby the managing node 110 is operative to perform the methods of FIG. 5-8. As another example, the instructions, when executed by the managing node 110 and/or the processing circuit 904, may cause the managing node 110 to perform the methods according to FIG. 5-8.

In view of the above, in one example, there is provided a managing node 110 for managing exchange of information relating to Packet Flow Descriptors, PFDs, between at least one application server 120 and at least one network exposure node 130 of an operator network 140. Again, the memory 902 contains the instructions executable by said processing circuit 904 whereby the managing node 110 is operative for:

receiving a message, originated from the application server 120, wherein the message comprises a PFD with a PFD identifier, an external application identifier associated with the PFD, a server identifier of the application server 120 originating the message, a transaction identifier, and a network exposure identifier identifying the operator network 140, storing, in a memory, the PFD associated with the PFD identifier, the external application identifier, the server identifier and the network exposure identifier, whereby a set of stored PFDs and associations are obtainable from the memory, selecting, based on the network exposure identifier, a network exposure node 130 amongst said at least one network exposure node 130, whereby the managing node 110 is configured to forward a PFD related to the external application identifier to the network exposure node 130, wherein the method comprises, when a PFD selection identifier is included in the message:

selecting, based on the PFD selection identifier, a further PFD amongst the set of stored PFDs, determining an action to be performed on the selected PFD, wherein the action is one of forwarding, updating and deleting; and transmitting, towards the selected network exposure node, the selected PFD and an indication of the determined action, and wherein the method otherwise comprises:

transmitting, towards the selected network exposure node 130, the received PFD with the PFD identifier, the external application identifier, the server identifier and the network exposure identifier.

FIG. 9 further illustrates a carrier 905, or program carrier, which comprises the computer program 903 as described directly above. The carrier 905 may be one of an electronic signal, an optical signal, a radio signal and a computer readable medium.

In some embodiments, the managing node 110 and/or the processing unit 901 may comprise one or more of a receiving unit 910, a storing unit 920, a selecting unit 930, a determining unit 940, and a transmitting unit 990 as exemplifying hardware units. The term "unit" may refer to a circuit when the term "unit" refers to a hardware unit. In other examples, one or more of the aforementioned exemplifying hardware units may be implemented as one or more software units.

Moreover, the managing node 110 and/or the processing unit 901 may comprise an Input/Output (I/O) circuit 906, which may be exemplified by the receiving unit and/or the transmitting unit when applicable.

Accordingly, the managing node 110 is configured for managing exchange of information relating to Packet Flow Descriptors, PFDs, between at least one application server 120 and at least one network exposure node 130 of an operator network 140.

Therefore, according to the various embodiments described above, the managing node 110 and/or the processing unit 901 and/or the receiving unit 910 is configured for receiving a message, originated from the application server 120. The message comprises a PFD with a PFD identifier, an external application identifier associated with the PFD, a server identifier of the application server 120 originating the message, a transaction identifier, and a network exposure identifier identifying the operator network 140.

The managing node 110 and/or the processing unit 901 and/or the storing unit 920 is configured for storing, in a memory, the PFD associated with the PFD identifier, the external application identifier, the server identifier and the network exposure identifier, whereby a set of stored PFDs and associations are obtainable from the memory.

The managing node 110 and/or the processing unit 901 and/or the selecting unit 930 is configured for selecting, based on the network exposure identifier, a network exposure node 130 amongst said at least one network exposure node 130. Thereby, the managing node 110 is configured to forward a PFD related to the external application identifier to the network exposure node 130.

The managing node 110 and/or the processing unit 901 and/or the selecting unit 930, or a further selection unit (not shown), is configured for selecting, based on the PFD selection identifier, a further PFD amongst the set of stored PFDs, when a PFD selection identifier is included in the message.

The managing node 110 and/or the processing unit 901 and/or the determining unit 940 is configured for determining an action to be performed on the selected PFD, when the PFD selection identifier is included in the message. The action is one of forwarding, updating and deleting.

The managing node 110 and/or the processing unit 901 and/or the transmitting unit 950 is configured for transmitting, towards the selected network exposure node, the selected PFD and an indication of the determined action, when the PFD selection identifier is included in the message.

The managing node 110 and/or the processing unit 901 and/or the transmitting unit 950 is configured for transmitting, towards the selected network exposure node 130, the received PFD with the PFD identifier, the external application identifier, the server identifier and the network exposure identifier otherwise, i.e. when the PFD selection identifier is excluded from the message.

The PFD selection identifier may correspond to a PFD source identifier identifying a third party from which the message is transmitted. The PDF source identifier is thus received at the managing node 110.

The PFD selection identifier may correspond to a PFD revision identifier identifying a change revision for a PFD, and the managing node 110 is configured to also store the PFD revision identifier associated with the PFD.

The PFD selection identifier may correspond to a PFD revision date identifier identifying a date of change for a PFD, and the managing node 110 is configured to also store the PFD revision date identifier associated with the PFD.

The managing node 110 may be configured to also store the PFD source identifier associated with the PFD.

The managing node 110 may implement at least one of a Service Capability Exposure Function, SCEF, and a Packet Flow Descriptor Function, PFDF.

The application server 120 may correspond to a Service Capability Server, SCS.

The network exposure node 130 may implement at least one of a Service Capability Exposure Function, SCEF, and a Packet Flow Descriptor Function, PFDF, or the like.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a managing node, for managing exchange of information relating to Packet Flow Descriptors, PFDs, between at least one application server and at least one network exposure node of an operator network, the method comprising:
receiving a message, originated from the application server, the message including a PFD with a PFD identifier, an external application identifier associated with the PFD, a server identifier of the application server originating the message, a transaction identifier, and a network exposure identifier identifying the operator network;
storing, in a memory, the PFD associated with the PFD identifier, the external application identifier, the server identifier and the network exposure identifier, a set of stored PFDs and associations being obtainable from the memory;
selecting, based on the network exposure identifier, a network exposure node amongst said at least one network exposure node, the managing node being configured to forward a PFD, related to the external application identifier, to the network exposure node;
when a PFD selection identifier is included in the message:
selecting, based on the PFD selection identifier, a further PFD amongst the set of stored PFDs;
determining an action to be performed on the selected PFD, the action being one of forwarding, updating and deleting; and
transmitting, towards the selected network exposure node, the selected PFD and an indication of the determined action; and
when the PFD selection identifier is absent from the message:
transmitting, towards the selected network exposure node, the PFD with the PFD identifier, the external application identifier, the server identifier and the network exposure identifier.

2. The method according to claim 1, wherein the PFD selection identifier corresponds to a PFD source identifier identifying a third party from which the message is received at the managing node.

3. The method according to claim 2, wherein the storing further comprises storing the PFD source identifier associated with the PFD in the memory.

4. The method according to claim 2, wherein the PFD selection identifier corresponds to a PFD revision identifier identifying a change revision for a PFD, and the managing node is configured to also store the PFD revision identifier associated with the PFD.

5. The method according to claim 2, wherein the PFD selection identifier corresponds to a PFD revision date identifier identifying a date of change for a PFD, and the managing node is configured to also store the PFD revision date identifier associated with the PFD.

6. The method according to claim 2, wherein the managing node implements at least one of a Service Capability Exposure Function, SCEF, and a Packet Flow Descriptor Function, PFDF.

7. The method according to claim 1, wherein the PFD selection identifier corresponds to a PFD revision identifier identifying a change revision for a PFD, and the managing node is configured to also store the PFD revision identifier associated with the PFD.

8. The method according to claim 1, wherein the PFD selection identifier corresponds to a PFD revision date identifier identifying a date of change for a PFD, and the managing node is configured to also store the PFD revision date identifier associated with the PFD.

9. The method according to claim 1, wherein the managing node implements at least one of a Service Capability Exposure Function, SCEF, and a Packet Flow Descriptor Function, PFDF.

10. The method according to claim 1, wherein the application server corresponds to a Service Capability Server, SCS.

11. The method according to claim 1, wherein the network exposure node implements at least one of a Service Capability Exposure Function, SCEF, and a Packet Flow Descriptor Function, PFDF.

12. A managing node configured for managing exchange of information relating to Packet Flow Descriptors, PFDs, between at least one application server and at least one network exposure node of an operator network, the managing node being configured to:
receive a message, originated from an application server, the message including a PFD with a PFD identifier, an external application identifier associated with the PFD, a server identifier of the application server originating the message, a transaction identifier, and a network exposure identifier identifying the operator network;
store, in a memory, the PFD associated with the PFD identifier, the external application identifier, the server identifier and the network exposure identifier, a set of stored PFDs and associations being obtainable from the memory;
select, based on the network exposure identifier, a network exposure node amongst said at least one network exposure node, the managing node being configured to forward a PFD, related to the external application identifier, to the network exposure node;
the managing node being configured to, when a PFD selection identifier is included in the message:
select, based on the PFD selection identifier, a further PFD amongst the set of stored PFDs;
determine an action to be performed on the selected PFD, the action being one of forwarding, updating and deleting; and
transmit, towards the selected network exposure node, the selected PFD and an indication of the determined action; and
the managing node is further configured to, when the PFD selection identifier is absent from the message:
transmit, towards the selected network exposure node, the PFD with the PFD identifier, the external application identifier, the server identifier and the network exposure identifier.

13. The managing node according to claim 12, wherein the PFD selection identifier corresponds to a PFD source identifier identifying a third party from which the message is received at the managing node.

14. The managing node according to claim 13, wherein the managing node is configured to also store the PFD source identifier associated with the PFD.

15. The managing node according to claim 12, wherein the PFD selection identifier corresponds to a PFD revision identifier identifying a change revision for a PFD, and the managing node is configured to also store the PFD revision identifier associated with the PFD.

16. The managing node according to claim 12, wherein the PFD selection identifier corresponds to a PFD revision date identifier identifying a date of change for a PFD, and the managing node is configured to also store the PFD revision date identifier associated with the PFD.

17. The managing node according to claim 12, wherein the managing node implements at least one of a Service Capability Exposure Function, SCEF, and a Packet Flow Descriptor Function, PFDF.

18. The managing node according to claim 12, wherein the application server corresponds to a Service Capability Server, SCS.

19. The managing node according to claim 12, wherein the network exposure node implements at least one of a Service Capability Exposure Function, SCEF, and a Packet Flow Descriptor Function, PFDF.

20. A non-transitory computer storage medium storing a computer program comprising computer readable code units which, when executed on a managing node causes the managing node to perform a method for managing exchange of information relating to Packet Flow Descriptors, PFDs, between at least one application server and at least one network exposure node of an operator network, the method comprising:

receiving a message, originated from the application server, the message including a PFD with a PFD identifier, an external application identifier associated with the PFD, a server identifier of the application server originating the message, a transaction identifier, and a network exposure identifier identifying the operator network;

storing, in a memory, the PFD associated with the PFD identifier, the external application identifier, the server identifier and the network exposure identifier, a set of stored PFDs and associations being obtainable from the memory;

selecting, based on the network exposure identifier, a network exposure node amongst said at least one network exposure node, the managing node being configured to forward a PFD, related to the external application identifier, to the network exposure node;

when a PFD selection identifier is included in the message:

selecting, based on the PFD selection identifier, a further PFD amongst the set of stored PFDs;

determining an action to be performed on the selected PFD, the action being one of forwarding, updating and deleting; and transmitting, towards the selected network exposure node, the selected PFD and an indication of the determined action; and when the PFD selection identifier is absent from the message:

transmitting, towards the selected network exposure node, the PFD with the PFD identifier, the external application identifier, the server identifier and the network exposure identifier.

* * * * *

UNITED STATES PATENT AND TRADEMARK OFFICE
CERTIFICATE OF CORRECTION

Page 1 of 1

PATENT NO. : 11,171,873 B2
APPLICATION NO. : 16/769882
DATED : November 9, 2021
INVENTOR(S) : Cañete Martinez et al.

It is certified that error appears in the above-identified patent and that said Letters Patent is hereby corrected as shown below:

On the Title Page

Item (54), in Title, in Column 1, Line 3, delete "DESCRIPTIONS" and insert -- DESCRIPTORS --, therefor.

On Page 2, item (56), under "OTHER PUBLICATIONS", in Column 1, Line 6, delete "inhancement"," and insert -- enhancement", --, therefor.

In the Specification

In Column 1, Line 3, delete "DESCRIPTION" and insert -- DESCRIPTORS --, therefor.

In Column 2, Line 9, delete "implement" and insert -- to implement --, therefor.

In Column 2, Line 21, delete "set" and insert -- sets --, therefor.

In Column 5, Line 65, delete "set" and insert -- sets --, therefor.

In Column 6, Line 30, delete "thanks" and insert -- thanks to --, therefor.

In Column 8, Line 29, delete "manging" and insert -- managing --, therefor.

In Column 9, Line 32, delete "Network)" and insert -- Networks) --, therefor.

In Column 13, Line 50, delete "deleting; and" and insert -- deleting, and --, therefor.

In Column 14, Line 62, delete "PDF" and insert -- PFD --, therefor.

Signed and Sealed this
Nineteenth Day of April, 2022

Katherine Kelly Vidal
*Director of the United States Patent and Trademark Office*